(12) United States Patent
Chen (10) Patent No.: US 9,915,283 B2
(45) Date of Patent: Mar. 13, 2018

(54) FIXTURE

(71) Applicant: SPORTSMAN CORPORATION, New Taipei (TW)

(72) Inventor: Jack Chen, New Taipei (TW)

(73) Assignee: SPORTSMAN CORPORATION, New Taipei (TW)

( * ) Notice: Subject to any disclaimer, the term of this patent is extended or adjusted under 35 U.S.C. 154(b) by 363 days.

(21) Appl. No.: 14/873,797

(22) Filed: Oct. 2, 2015

(65) Prior Publication Data

US 2016/0108954 A1 Apr. 21, 2016

(30) Foreign Application Priority Data

Oct. 21, 2014 (TW) .............................. 103136271 A (51) Int. Cl.
*F16B 47/00* (2006.01)
*F16B 2/10* (2006.01)
(Continued)

(52) U.S. Cl.
CPC .............. *F16B 47/006* (2013.01); *F16B 2/10* (2013.01); *F16B 47/00* (2013.01); *F16M 11/041* (2013.01); *F16M 13/00* (2013.01); *F16M 13/022* (2013.01)

(58) Field of Classification Search
CPC ... F16M 11/041; F16M 13/022; F16B 47/006; F16B 2/10; Y10T 24/3936; B25B 5/00;
(Continued)

(56) References Cited

U.S. PATENT DOCUMENTS 3,908,449 A * 9/1975 Zuber ...................... G01N 3/04
269/25
7,380,759 B1 6/2008 Whiteside
(Continued)

FOREIGN PATENT DOCUMENTS

CN          2660284 Y    12/2004
CN        101367356 A     2/2009
(Continued)

OTHER PUBLICATIONS

Extended European search report of corresponding EPC application dated Mar. 3, 2016, dated Mar. 15, 2016.

*Primary Examiner* — Christopher M Koehler
*Assistant Examiner* — Mahdi H Nejad
(74) *Attorney, Agent, or Firm* — patenttm.us (57) ABSTRACT

A fixture has an adsorbing assembly and a clamping assembly. The adsorbing assembly has a flexible disc, a cover, and a handle. The flexible disc has a pulling pole. The cover has a positioning pipe and two protruding portions. The positioning pipe is formed centrally on the cover. The two protruding portions are located at two sides of the positioning pipe. The handle has two fastening portions respectively fastened with the two protruding portions. The clamping assembly has a first clamping portion, an adjusting component, a pivot clamping portion and a second clamping portion. The first clamping portion has a cylinder. The adjusting component is mounted in the first clamping portion. The pivot clamping portion is connected to the cylinder of the first clamping portion. The second clamping portion is combined with the first clamping portion to position the pivot clamping portion.

10 Claims, 6 Drawing Sheets

(51) Int. Cl.
  *F16M 13/02* (2006.01)
  *F16M 13/00* (2006.01)
  *F16M 11/04* (2006.01)

(58) Field of Classification Search
  CPC .... B25B 5/04; B25B 5/06; B25B 1/00; B25B 1/04; B25B 1/06
  USPC ........ 269/122, 138, 190, 229–239, 209–224, 269/204, 203, 188, 171, 170, 169, 166, 269/159, 90, 89, 53, 54, 54.1, 54.2, 54.3, 269/54.4, 54.5, 24–27, 32, 6, 3, 193; 248/74.1, 68.1, 73, 74.2, 49, 65, 346.04, 248/64
  See application file for complete search history.

(56) References Cited

U.S. PATENT DOCUMENTS

| | | | |
|---|---|---|---|
| 7,441,734 B2* | 10/2008 | Liou | B60R 11/02 248/205.5 |
| 7,527,230 B2* | 5/2009 | Chiang | B60R 11/0235 248/205.5 |
| 7,712,720 B1* | 5/2010 | Cheng | B60R 11/00 248/205.5 |
| 8,307,676 B2 | 11/2012 | Irisawa | |
| 8,876,072 B2* | 11/2014 | Hsu | F16B 47/003 248/205.5 |
| 2002/0162201 A1 | 11/2002 | Liu | |
| 2007/0152119 A1* | 7/2007 | Wang | F16B 47/006 248/205.5 |
| 2007/0262217 A1 | 11/2007 | Wang et al. | |
| 2010/0282928 A1* | 11/2010 | Hsu | F16B 47/00 248/205.4 |
| 2013/0306543 A1* | 11/2013 | Beisser | A61M 5/1418 210/321.6 |

FOREIGN PATENT DOCUMENTS

| | | |
|---|---|---|
| CN | 202751281 U | 2/2013 |
| CN | 203819146 U | 9/2014 |
| EP | 2420687 A1 | 2/2012 |
| TW | M332613 U | 5/2008 |

* cited by examiner

FIXTURE

BACKGROUND OF THE INVENTION

1. Field of the Invention

The present invention relates to a fixture, especially a fixture with a function of adsorption.

2. Description of the Prior Arts

Multiple kinds of fixtures are applied in industry such as machine fixture, stamping fixture, heat treatment fixture, welding fixture, assembling fixture and so on. The conventional fixture is to clamp a tool tightly. For example, a fixture mounted on a machine is used to clamp a work piece or a cutting tool. However, the conventional fixture is mostly applied for industrial use and is often made of mental due to the requirement of robustness and safety. So the conventional fixture is heavy and difficult to move, and needs to be fixed on a site for use. For transporting to another site, the conventional fixture needs to be disassembled, so the conventional fixture is inconvenient and is seldom applied to daily applications.

To overcome the shortcomings, the present invention provides a fixture to mitigate or obviate the aforementioned problems.

SUMMARY OF THE INVENTION

The main objective of the present invention is to provide a fixture that can be applied to daily use and has properties of convenient storage and simple installation.

The fixture comprises an adsorbing assembly and a clamping assembly.

The adsorbing assembly has a flexible disc, a cover, a handle, and a spindle. The flexible disc is made of soft material and has a pulling pole formed centrally on the flexible disc. The cover is mounted on the flexible disc and has a positioning pipe and two protruding portions. The positioning pipe is formed centrally on a top surface of the cover and receives the pulling pole of the flexible disc. The two protruding portions are formed on the top surface of the cover and are respectively located at two opposite sides of the positioning pipe. The handle is connected to the positioning pipe of the cover and has two fastening portions. The two fastening portions are respectively fastened with the two protruding portions of the cover. The spindle is mounted through the two fastening portions, the positioning pipe of the cover, and the pulling pole of the flexible disc. The flexible disc is pulled upward by the handle and the spindle.

The clamping assembly is mounted in the cover of the adsorbing assembly and has a first clamping portion, a second clamping portion, an adjusting component, and a pivot clamping portion. The first clamping portion has an inner surface, a bottom surface, a first placement region, and a second placement region. The first placement region is formed on the inner surface of the first clamping portion. The second placement region is formed on a bottom surface of the first clamping portion. The second clamping portion is combined with the first clamping portion. The adjusting component is clamped between the first clamping portion and the second clamping portion, and has a fastening plate, a sliding pole, and two compression springs. The fastening plate is vertically and movably mounted in the second placement region. The sliding pole is transversely and moveably mounted through the fastening plate and the first clamping portion and faces the first placement region. The two compression springs are respectively mounted in the first placement region and the second placement region, and respectively push the fastening plate and sliding pole. The pivot clamping portion is pivotally connected between the first clamping portion and the second clamping portion, and has a pushing groove. The pushing groove is formed on a bottom of the pivot clamping portion and receives and abuts a top end of the fastening plate.

The present invention has an adsorbing assembly and a clamping assembly. When the present invention is in use, the adsorbing assembly can be mounted securely on a ground, a table, or a vehicle top. The flexible disc is pulled upward by the handle, so an interstice is formed between the flexible disc and a surface of the ground, table, or a vehicle top. The pressure in the interstice is smaller than the surrounding atmospheric pressure to achieve the adsorbing effect, so the adsorbing assembly of the present invention is easier to disassemble than the locking assembly of the conventional technique. The clamping assembly can be used to clamp a cylinder with a covering cloth. The covering cloth is unfolded to shield the vehicle top. The adsorbing state of the adsorbing assembly can be released by turning the handle, and the present invention has an advantage of easy disassembly.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
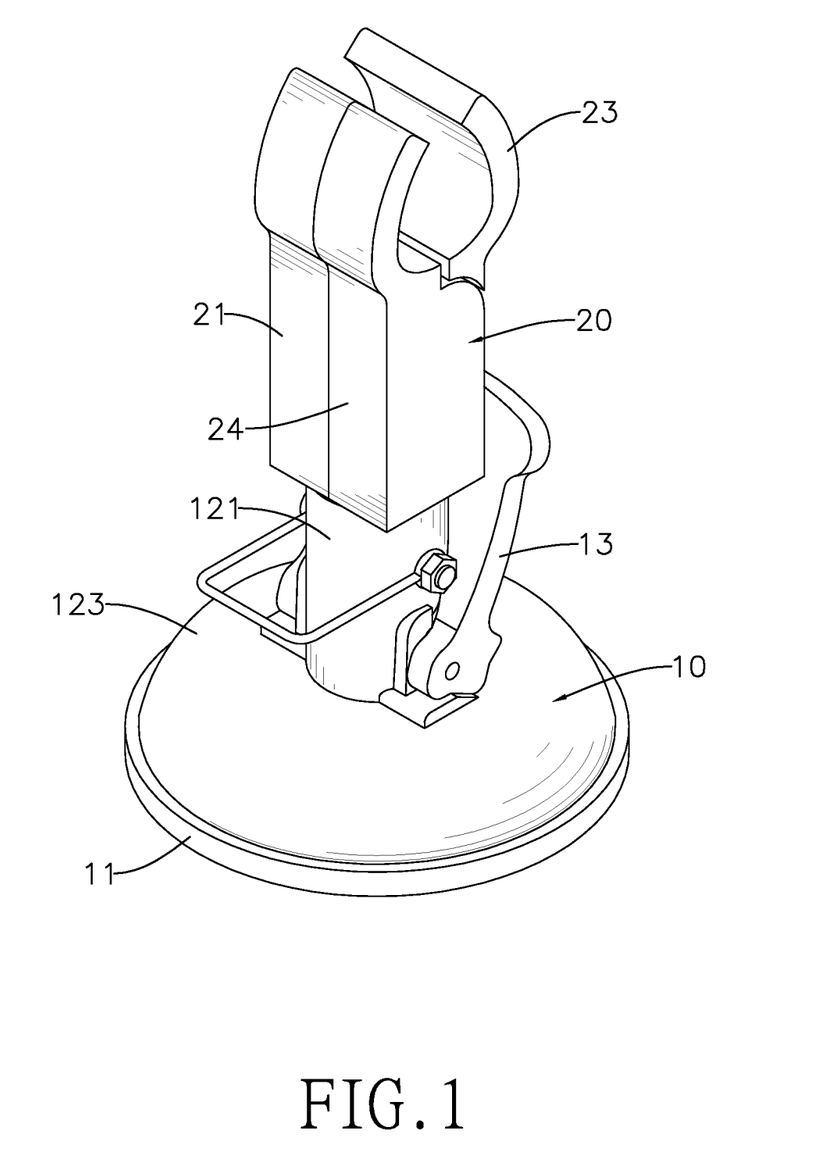
FIG. 1 is a perspective view of a fixture in accordance with the present invention.
Figure 2:
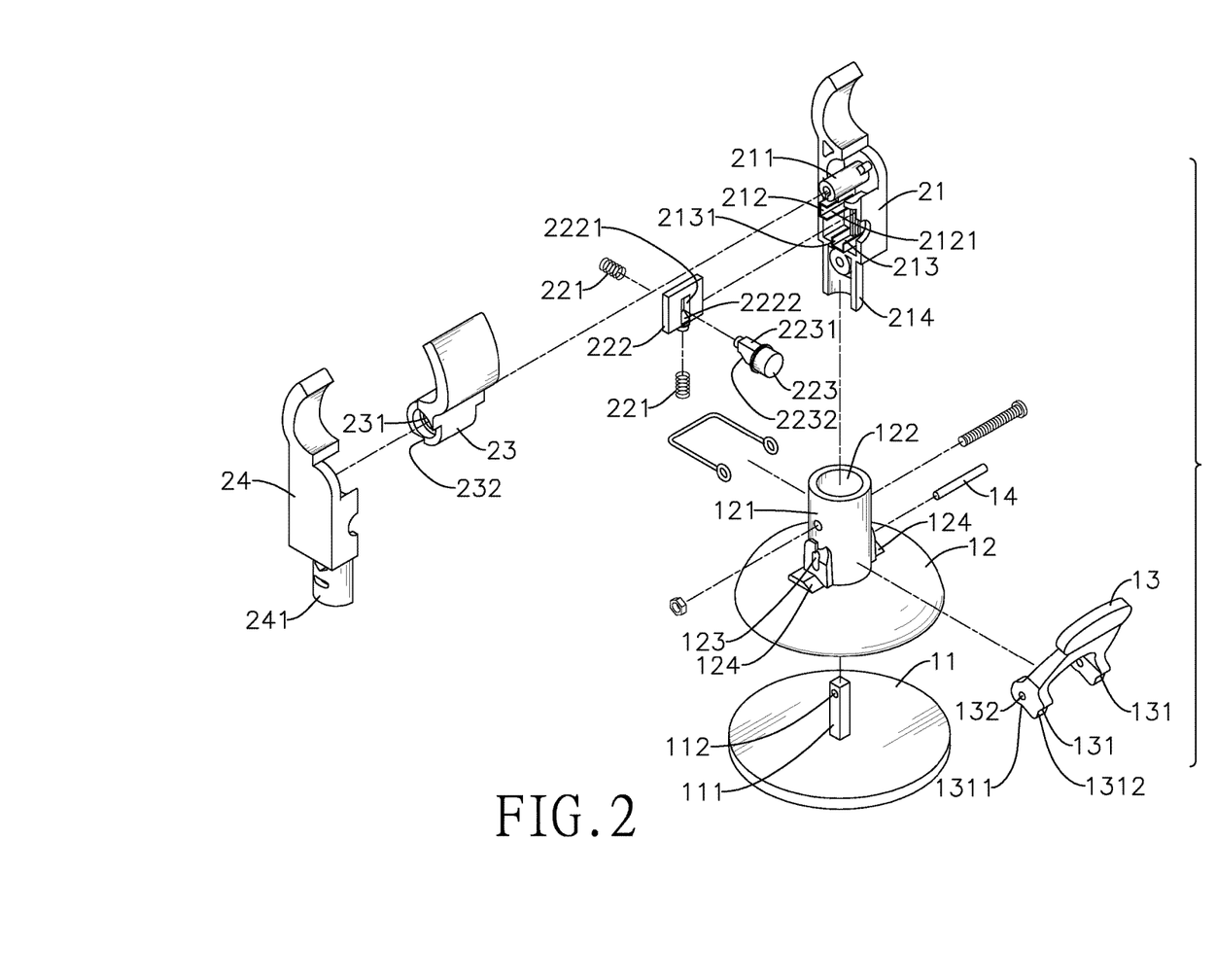
FIG. 2 is an exploded perspective view of the fixture in FIG. 1.
Figure 5:
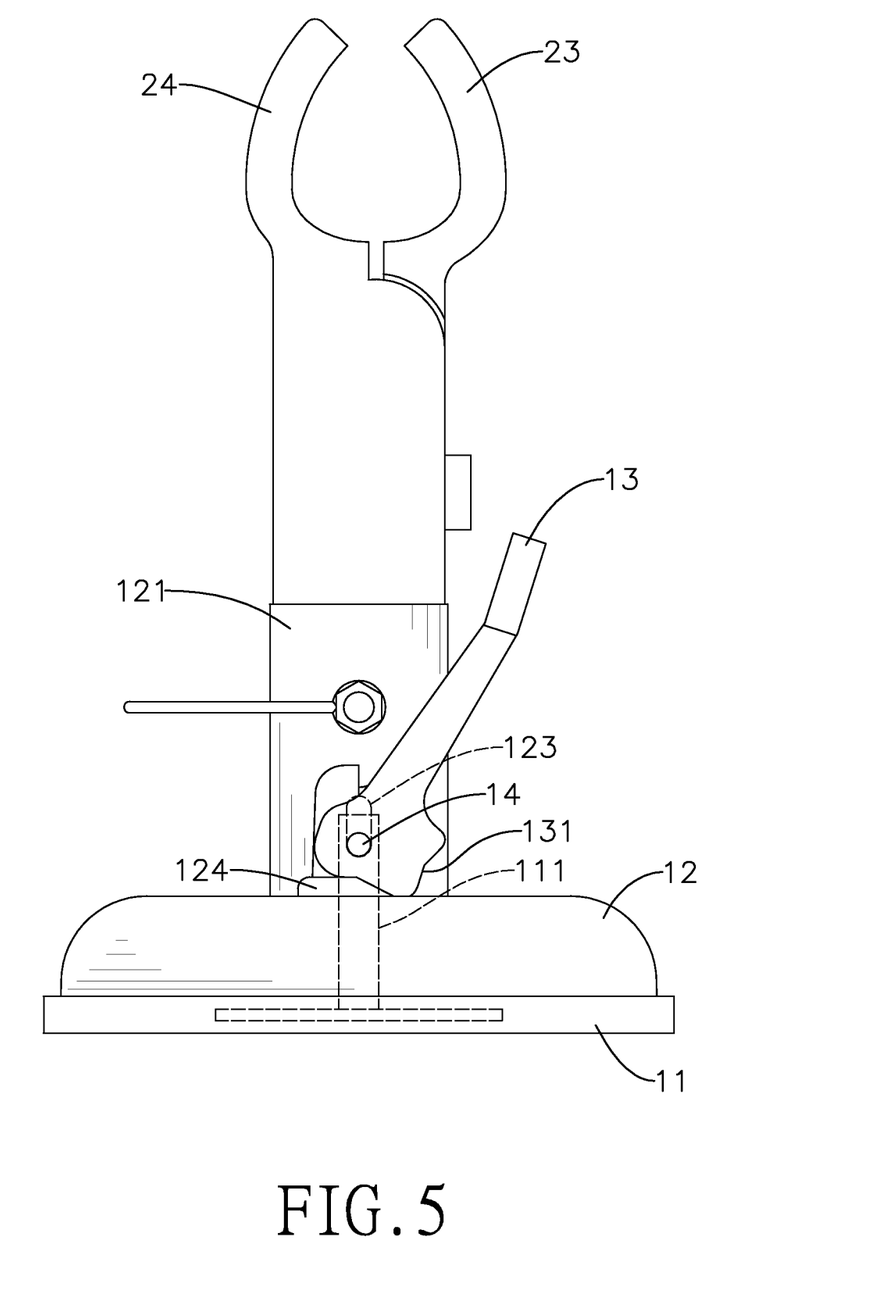
FIG. 5 is a partial perspective view of an adsorbing assembly of the fixture in FIG. 1.

With reference to FIG. 1, a fixture in accordance with the present invention comprises an adsorbing assembly 10 and a clamping assembly 20. With reference to FIGS. 2 and 5, the adsorbing assembly 10 has a flexible disc 11, a cover 12, a handle 13, and a spindle 14. The flexible disc 11 is made of soft material and has a pulling pole 111 formed centrally on the flexible disc 11. The pulling pole 111 has an end distal from the flexible disc 11 and a through hole 112 formed through two opposite sides of the pulling pole 111 and disposed adjacent to the end of the pulling pole 111. The cover 12 is curved and mounted on a top of the flexible disc 11 and has a positioning pipe 121, a receiving hole 122, two elongated holes 123, and two protruding portions 124. The positioning pipe 121 is formed centrally on a top surface of the cover 12. The receiving hole 122 is vertically formed through the positioning pipe 11 and communicates with the cover 12, and the receiving hole 122 is disposed around the pulling pole 111. The two elongated holes 123 are transversely formed through the positioning pipe 121 and align with the through hole 112 of the pulling pole 111. The two protruding portions 124 are formed on the top surface of the cover 12 and the two elongated holes 123 are respectively located above the two protruding portions 124.

The handle 13 is connected to the positioning pipe 121 of the cover 12 and has two fastening portions 131 and two handle openings 132. The two fastening portions 131 are formed at an interval on the handle 13. The two fastening portions 131 are respectively fastened with the two protruding portions 124 of the cover 12 and each fastening portion 131 has a first notch 1311 and a second notch 1312. The two handle openings 132 are respectively formed through the two fastening portions 131 and align with the two elongated holes 123. A distance from the first notch 1311 to the handle opening 132 is smaller than a distance from the second notch 1312 to the handle opening 132. The spindle 14 is mounted through the two handle openings 132 of the handle 13, the two elongated holes 123 of the positioning pipe 12, and the through hole 112 of the pulling pole 111. The pulling pole 111 is pulled upward by pressing the handle 13 and the spindle 14.

Figure 3:
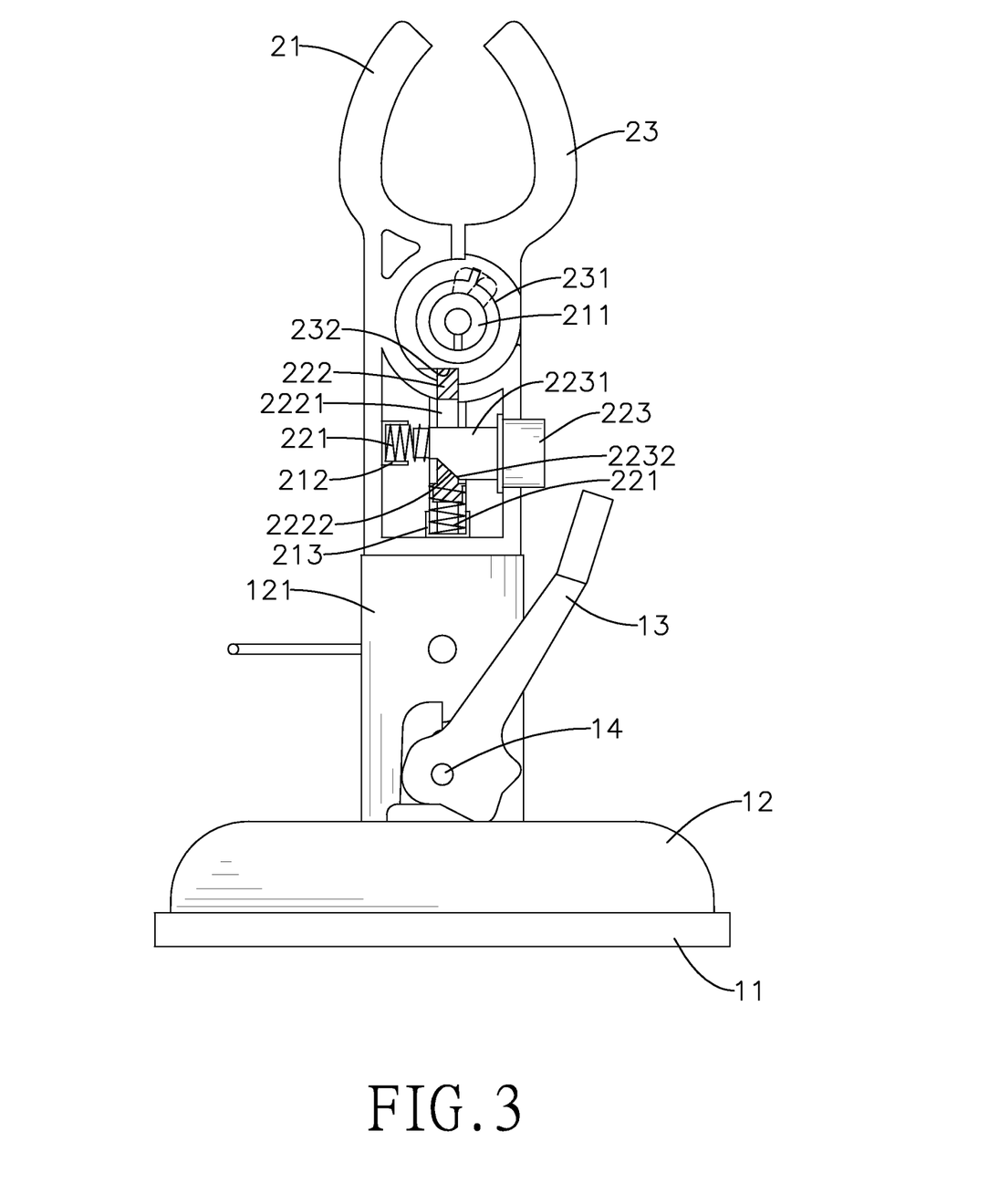
FIG. 3 is a partial cross-sectional side view of a clamping assembly of the fixture in FIG. 1, shown in a clamping state.

With reference to FIGS. 2 and 3, the clamping assembly 20 is mounted in the cover 12 of the adsorbing assembly 10 and has a first clamping portion 21, an adjusting component 22, a pivot clamping portion 23, and a second clamping portion 24. The first clamping portion 21 has an inner surface, a bottom surface, an outer surface, a cylinder 211, a first placement region 212, a second placement region 213, and a first extending pole 214. The cylinder 211 is formed on the inner surface of the first clamping portion 21. The first placement region 212 is formed on the inner surface of the first clamping portion 21 and is located under the cylinder 211. The second placement region 213 is formed on the bottom surface of the first clamping portion 21. The first placement region 212 has a first opening 2121 facing an inner side of the first clamping portion 21. The second placement region 213 has a second opening 2131 facing the cylinder 211 at a top side of the first clamping portion 21, and the direction of the second opening 2131 is perpendicular to the direction of the first opening 2121. The first extending pole 214 is formed on the outer surface of the first clamping portion 21.

The adjusting component 22 is mounted in the first clamping portion 21 and has two compression springs 221, a fastening plate 222, and a sliding pole 223. The two compression springs 221 are respectively mounted in the first placement region 212 and the second placement region 213, so the two compression springs 221 are mounted perpendicularly to each other in the first clamping portion 21. The fastening plate 222 is vertically and movably mounted in the second placement region 213, and is pushed by the compression spring 221 in the second placement region 222. The fastening plate 222 has a fastening hole 2221 and a fastening surface 2222. The fastening hole 2221 is formed through the fastening plate 222. The fastening surface 2222 is formed obliquely on a bottom side of the fastening hole 2221. The sliding pole 223 is transversely and moveably mounted through the first clamping portion 21 and has a pushing portion 2231 and a pushing surface 2232 formed obliquely on a bottom side of the pushing portion 2231. The pushing portion 2231 is mounted through the fastening hole 2221 of the fastening plate 222 and the pushing surface 2232 pushes the fastening surface 2222. The sliding pole 223 is pushed by the compression spring 221 in the first placement region 221.

The pivot clamping portion 23 has a pivot hole 231 and a pushing groove 232. The pivot hole 231 is pivotably disposed around the cylinder 211 of the first clamping portion 21. The pushing groove 232 is formed on a bottom of the pivot clamping portion 23 and abuts a top end of the fastening plate 222, and the pivot clamping portion 23 is fastened with the adjusting component 22. The second clamping portion 24 is combined with the first clamping portion 21 and has an outer surface and a second extending pole 241. The second extending pole 241 is formed on the outer surface of the second clamping portion 24. The second extending pole 241 is combined with the first extending pole 214 to form a column and the column is mounted securely in the positioning pipe 121 of the cover 12. The first clamping portion 21 and the second clamping portion 24 position the pivot clamping portion 23 and cover the adjusting component 22. The pivot clamping portion 23 can be pivoted around the cylinder 211 relative to the first clamping portion 21 and the second clamping portion 24.

Figure 6:
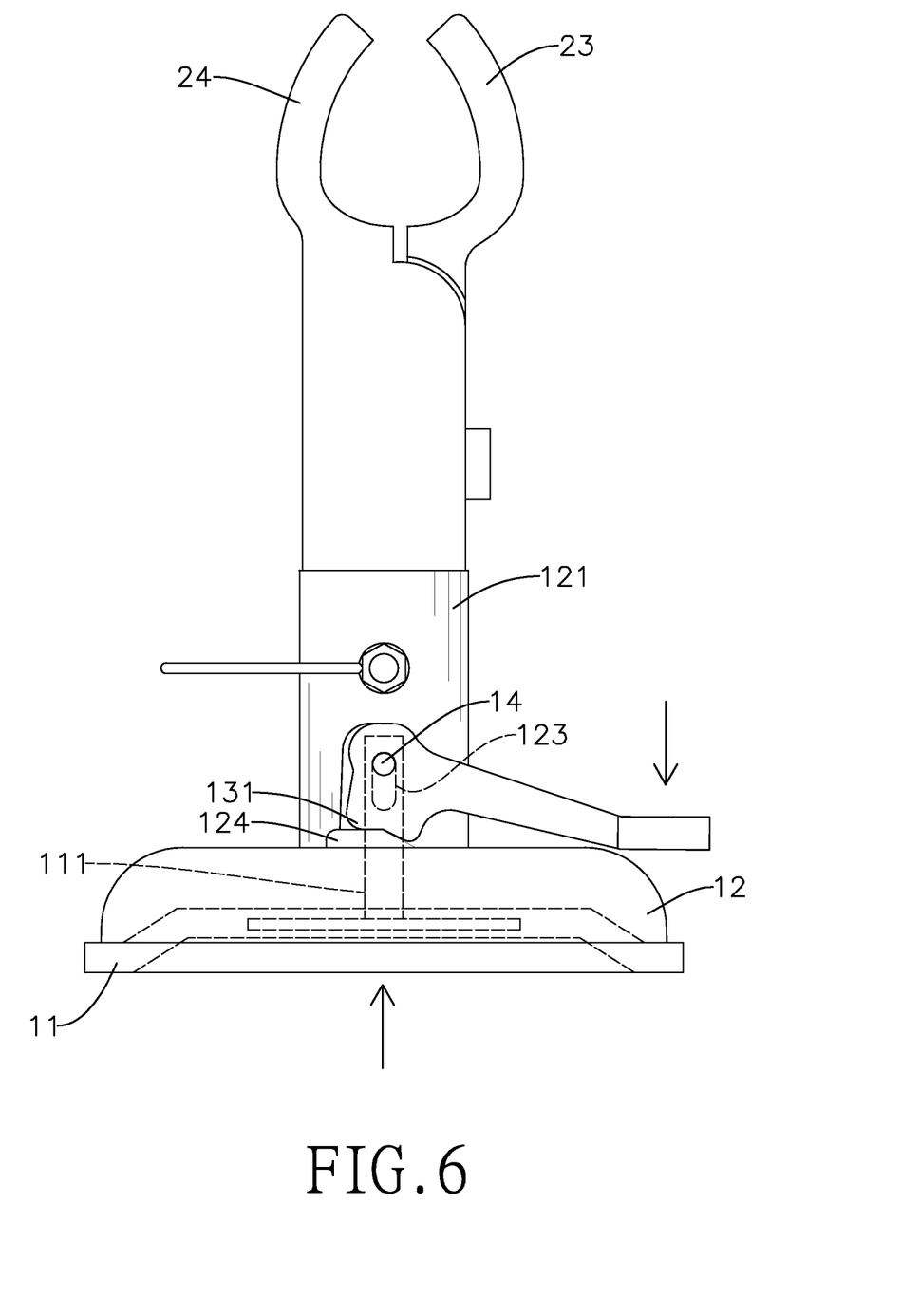
FIG. 6 is a partial perspective operating view of the adsorbing assembly of the in fixture FIG. 1.

With reference to FIGS. 5 and 6, the adsorbing assembly 10 of the present invention can be mounted on a top of a vehicle for mounting a covering cloth. When in use, the handle 13 is pressed downward by external forces to make the two second notches 1312 of the two fastening portions 131 respectively fastened with the two protruding portions 124 of the cover 12. The spindle 14 is moved upward along the two elongated holes 123 relative to the cover 12 by the handle 13. At the same time, the pulling pole 111 of the flexible disc 11 is pulled upward by the spindle 14 and the pulling pole 111 makes the flexible disc 11 deformed elastically. Finally, an interstice is formed between the flexible disc 11 and a surface of the vehicle. The pressure in the interstice is smaller than the surrounding atmospheric pressure to achieve the adsorbing effect.

Figure 4:
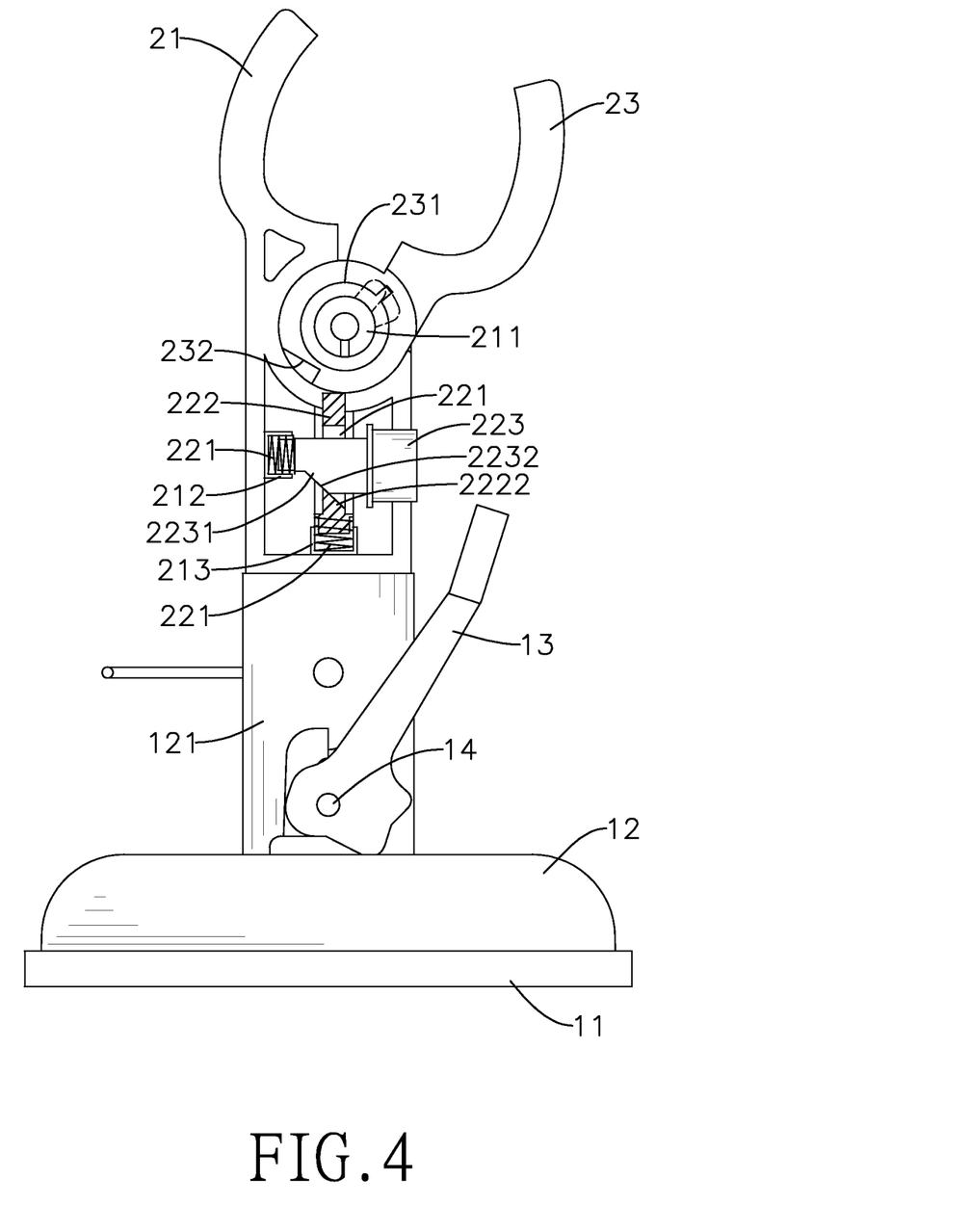
FIG. 4 is a partial cross-sectional side view of the clamping assembly of the fixture in FIG. 1, shown in a released state.

With reference to FIGS. 3 and 4, the clamping assembly 20 can be used to clamp a cylinder. When the clamping assembly is in use, the pivot clamping portion 23 is pivoted by external forces to be moved away from the first clamping portion 21 and the second clamping portion 24. In the pivoting process, the fastening plate 222 is pushed away from the pushing groove 232 and is finally pushed downward by an outer surface of the clamping portion 23. The pushing portion 2231 of the sliding pole 223 moves towards the first placement region 212 along the fastening hole 2221. The fastening plate 222 is supported by the compression spring 221 in the second placement region 213 to push upward the pivot clamping portion 23. So the pivot clamping portion 23, the first clamping portion 21, and the second clamping portion 24 are released from clamping. Therefore, a cylinder with a covering cloth can be mounted between the pivot clamping portion 23, the first clamping portion 21, and the second clamping portion 24. After the cylinder with a covering cloth is mounted, the pivot clamping portion 23 is pivoted reversely to release downward clamping of the fastening plate 222. The fastening plate 222 and the sliding pole 223 are pushed to the original position by the two compression springs 221. The cylinder is clamped securely by the pivot clamping portion 23, the first clamping portion 21, and the second clamping portion 24. So the covering cloth is unfolded to shield the vehicle top.

The present invention combines an adsorbing assembly 10 and a clamping assembly 20. The adsorbing assembly 20 can be mounted securely on a wall, a ground, a table, or a vehicle top. The adsorbing assembly 20 can accomplish or release the adsorbing effect by pressing the handle, and the present invention has the advantage of easy disassembly and storage. So the present invention is suitable for applications in daily use and has improved utility in practice.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A fixture comprising:
   an adsorbing assembly having
      a flexible disc made of soft material and having a pulling pole formed centrally on the flexible disc;
      a cover mounted on the flexible disc and having
         a top surface;
         a positioning pipe formed centrally on the top surface of the cover and receiving the pulling pole of the flexible disc; and
         two protruding portions formed on the top surface of the cover and respectively located at two opposite sides of the positioning pipe;
      a handle connected to the positioning pipe of the cover and having
         two fastening portions respectively fastened with the two protruding portions of the cover; and
      a spindle mounted through the two fastening portions of the handle, the positioning pipe of the cover, and the pulling pole of the flexible disc, wherein when the handle is pressed, the spindle is moved upward relative to the cover by the handle to pull up the pulling pole of the flexible disc to make the flexible disc deformed elastically;
   a clamping assembly mounted in the cover of the adsorbing assembly and having
      a first clamping portion having
         a first placement region formed on an inner surface of the first clamping portion and having a first opening facing an inner side of the first clamping portion; and
         a second placement region formed on a bottom surface of the first clamping portion and having a second opening facing a top side of the first clamping portion and the direction of the second opening is perpendicular to the direction of the first opening;
      a second clamping portion combined with the first clamping portion;
      an adjusting component clamped between the first clamping portion and the second clamping portion, and having
         a fastening plate vertically and movably mounted in the second placement region;
         a sliding pole transversely and moveably mounted through the fastening plate and the first clamping portion and facing the first placement region; and
         two compression springs respectively mounted in the first placement region and the second placement region, and respectively pushing the fastening plate and the sliding pole;
      a pivot clamping portion pivotally connected between the first clamping portion and the second clamping portion, and having
         a pushing groove formed on a bottom of the pivot clamping portion and abutting a top end of the fastening plate to make the pivot clamping portion fastened with the adjusting component.

2. The fixture as claimed in claim 1, wherein
   the pulling pole of the flexible disc has
      an end distal from the flexible disc; and
      a through hole formed through two opposite sides of the pulling pole and disposed adjacent to the end of the pulling pole;
   the cover is curved and has
      a receiving hole vertically formed through the positioning pipe, communicating with the cover, and disposed around the pulling pole;
      two elongated holes transversely formed through the positioning pipe, aligning with the through hole of the pulling pole, and respectively located above the two protruding portions; and
   the handle has two handle openings respectively formed through the two fastening portions and aligning with the two elongated holes, the spindle is mounted through the two handle openings of the handle, the two elongated holes of the positioning pipe, and the through hole of the pulling pole, and the two fastening portions are formed at an interval on the handle.

3. The fixture as claimed in claim 1, wherein
   the fastening plate has
      a fastening hole formed through the fastening plate and having a bottom side;
      a fastening surface formed obliquely on the bottom side of the fastening hole; and
   the sliding pole has
      a pushing portion mounted through the fastening hole of the fastening plate and having a bottom side; and
      a pushing surface formed obliquely on the bottom side of the pushing portion and pushing the fastening surface.

4. The fixture as claimed in claim 2, wherein
   the fastening plate has
      a fastening hole formed through the fastening plate and having a bottom side;
      a fastening surface formed obliquely on the bottom side of the fastening hole; and
   the sliding pole has
      a pushing portion mounted through the fastening hole of the fastening plate and having a bottom side; and
      a pushing surface formed obliquely on the bottom side of the pushing portion and pushing the fastening surface.

5. The fixture as claimed in claim 1, wherein
   the first clamping portion has a cylinder formed on the inner surface of the first clamping portion;
   the pivot clamping portion has
      a pivot hole pivotally disposed around the cylinder of the first clamping portion;
   the pushing groove is formed on and around a bottom of the pivot hole of the pivot clamping portion and abuts the top end of the fastening plate; and
   the pivot clamping portion is fastened with the adjusting component.

6. The fixture as claimed in claim 4, wherein
   the first clamping portion has a cylinder formed on the inner surface of the first clamping portion;
   the pivot clamping portion has
      a pivot hole pivotally disposed around the cylinder of the first clamping portion;
   the pushing groove is formed on and around a bottom of the pivot hole of the pivot clamping portion and abuts the top end of the fastening plate; and
   the pivot clamping portion is fastened with the adjusting component.

7. The fixture as claimed in claim 1, wherein
   the first clamping portion has
      an outer surface; and a first extending pole formed on the outer surface of the first clamping portion;

the second clamping portion has
an outer surface; and
a second extending pole formed on the outer surface of the second clamping portion and combined with the first extending pole to form a column and the column mounted securely in the positioning pipe of the cover.

8. The fixture as claimed in claim 6, wherein
the first clamping portion has
an outer surface; and
a first extending pole formed on the outer surface of the first clamping portion;

the second clamping portion has
an outer surface; and
a second extending pole formed on the outer surface of the second clamping portion and combined with the first extending pole to form a column and the column mounted securely in the positioning pipe of the cover.

9. The fixture as claimed in claim 1, wherein each of the two fastening portions has a first notch and a second notch, the first notch or the second notch is fastened with the corresponding protruding portion, and a distance from the first notch to the spindle is smaller than a distance from the second notch to the spindle.

10. The fixture as claimed in claim 8, wherein each of the two fastening portions has a first notch and a second notch, the first notch or the second notch is fastened with the corresponding protruding portion, and a distance from the first notch to the spindle is smaller than a distance from the second notch to the spindle.

* * * * *